Patented Apr. 24, 1934

1,956,427

UNITED STATES PATENT OFFICE 1,956,427

FLAKED CEREAL BEVERAGE PRODUCT

Ronald B. McKinnis, Pittsburgh, Pa., assignor to Continental Can Company, Inc., New York, N. Y., a corporation of New York No Drawing. Application April 3, 1933, Serial No. 664,288

1 Claim. (Cl. 99—11)

The invention relates to new and useful improvements in a cereal beverage product.

An object of the present invention is to provide a cereal product in form for use in the preparation of a beverage wherein the soluble ingredients are readily and equally accessible to an extracting liquid.

Table beverages have been prepared from cereal products by steeping or percolating the roasted material and serving in a manner similar to serving coffee. It is found by experience that the time required for the preparation of such beverages is particularly prohibitive of its use where quick service is demanded, as in hotels and restaurants. Furthermore, it has been found difficult to brew a beverage in this manner which is clear and possesses to the fullest extent the flavor and desirable properties, characteristic of the roasted product. It has also been a common expedient to prepare a solid extract of the roasted materials which is reduced to powdered form and which is quickly soluble in water. This has been accomplished by treating the roasted product with water so as to produce an aqueous extract, after which the solution is concentrated by evaporation and the solid concentrate reduced to powdered form. When the beverage is formed in this manner, it loses much of its flavor and the desirable properties characteristic of the roasted product.

The present invention is directed to the preparation of a cereal product from which a beverage can be directly produced by extraction and very quickly, and by the usual methods followed in the producing of a coffee beverage. In the preparation of the improved product, any suitable form of cereal may be used, such as wheat, rye, corn, barley, malted or unmalted, or other like starchy products or mixtures of the same. A saccharine material is added thereto, such as New Orleans molasses, sugar, syrups, either cane or glucose, and figs, prunes or other fruits may be added. It is preferred, however, to employ a mixture of wheat, bran and New Orleans molasses. The wheat bran is mixed with New Orleans molasses, and the mixture is treated to make it homogeneous, after which it is dried and roasted. The roast is carried to the point of browning and thoroughly caramelizing the sugar of the molasses. Wheat, preferably whole wheat is roasted to effect dextrinizing of the starchy contents of the grain. It is then ground or broken into coarse particles and mixed with the roasted bran and molasses. Such a product as described above has been used in the preparation of a solid soluble extract. The present invention has particularly to do with the preparing of this product as described above in form for rendering the soluble ingredients of the vegetable tissues readily and equally accessible to an extracting liquid, so that the beverage may be made for use very quickly and directly from the roasted cereal by the ordinary methods of extraction.

The coarsely ground roasted particles of cereal with the mixture of bran and caramalized saccharine material are tempered in order to render the vegetable tissues pliable. This is accomplished by applying a spray of water or a jet of steam to the cereal particles, or by tumbling the particles in a warm room or in a container, the atmosphere of which is saturated with water vapor. The cereal particles absorb the moisture and become pliable. One or two days may be necessary for uniformly completing the tempering of the particles. The next step in the reducing of the cereal product to a form for extraction consists in passing the tempered particles between rolls whereby the vegetable tissues are subjected to a tremendous crushing pressure. The rolls are preferably hot, and the particles pass from the rolls in thin firm coherent flakes, and of such thinness as to render all of the soluble ingredients equally and readily accessible to an extracting liquid. It has been found expedient to reduce the vegetable tissues of the cereal to approximately a thinness of .001 of an inch. By the addition of the water vapor in the manner above described it is possible to hydrate the fibers and gummy materials sufficient to cause them to flow during the subjecting of the same to pressure and to produce the thin coherent flakes. The pressure produces a plastic flow within the particles, and the particles are simultaneously made thinner and increase in area, rupturing many of the cells, but without disintegrating the fibers. This will render the soluble ingredients substantially equally and readily accessible to the extracting liquid. The fibers are sufficiently held intact so that a clear beverage is produced by the extracting liquid. These flakes are quickly penetrated by water, and being readily wettable, the insoluble ingredients will quickly settle during extraction and aid in the decanting or separating of the clear beverage therefrom.

The flaked cereal product thus formed has the advantage over the beverage cereals heretofore produced in that the beverage may be extracted directly from the roasted cereal for use by the usual methods of extracting and forming of other table beverages, and this can be quickly accomplished and a clear beverage produced which possesses to the fullest extent the flavor and desirable properties characteristic of the roasted cereal product.

It is understood that other cereals may be used in the carrying out of the invention, and modifications may be made in the treatment of the cereal and in the method of preparing the same for extraction. The essential features of both the product and the method consist in the producing of a cereal beverage product in the form which renders the soluble ingredients equally and readily accessible to an extracting liquid so that the producing of the beverage for use may be quickly accomplished while retaining to the fullest extent the flavor and desired properties characteristic of the roasted cereal product.

Having thus described the invention, what I claim as new and desire to secure by Letters Patent, is—

A dry cereal beverage product containing extractible matter, consisting of roasted cereal tissues in the form of firm individual flakes, each having a coherent crushed fibrous structure in which many of the cells have been ruptured without completely disintegrating the tissues, which flakes are of such uniform thinness as to render the soluble ingredients thereof substantially equally accessible to an extracting medium.

RONALD B. McKINNIS.